United States Patent [19]

Malzkorn

[11] Patent Number: 4,676,362

[45] Date of Patent: Jun. 30, 1987

[54] CONTROL CENTER FOR WORKPIECES

[75] Inventor: Matthias Malzkorn, Jüchen, Fed. Rep. of Germany

[73] Assignee: Scharmann GmbH & Co., Monchen-Gladbach, Fed. Rep. of Germany

[21] Appl. No.: 763,941

[22] Filed: Aug. 8, 1985

[30] Foreign Application Priority Data

Aug. 8, 1984 [DE] Fed. Rep. of Germany ....... 3429205

[51] Int. Cl.$^4$ .............................................. B65G 37/00
[52] U.S. Cl. .................................. 198/465.1; 104/167
[58] Field of Search ................. 198/346.1, 345, 465.1, 198/465.2, 583, 584, 586, 666; 414/222, 223; 29/33 P, 563; 104/166, 167

[56] References Cited

U.S. PATENT DOCUMENTS

| | | | |
|---|---|---|---|
| 1,924,455 | 8/1933 | Penote | 74/385 |
| 2,139,403 | 12/1938 | Cole | 29/33 P |
| 2,986,261 | 5/1961 | Wenstrand | 198/586 |
| 3,289,819 | 12/1966 | Steinmetz | 198/666 |
| 3,530,571 | 9/1970 | Perry | 29/563 |
| 4,291,797 | 9/1981 | Ewertowski | 198/465.1 |
| 4,380,939 | 4/1983 | Gardner | 198/345 |
| 4,515,264 | 5/1985 | Sticht | 198/465.2 |

FOREIGN PATENT DOCUMENTS

| | | | |
|---|---|---|---|
| 2851699 | 6/1980 | Fed. Rep. of Germany . | |
| 3101661 | 8/1982 | Fed. Rep. of Germany . | |
| 223553 | 12/1983 | Japan | 198/346.1 |
| 80/00559 | 4/1980 | PCT Int'l Appl. | 198/465.1 |

*Primary Examiner*—Joseph E. Valenza
*Attorney, Agent, or Firm*—Becker & Becker, Inc.

[57] ABSTRACT

A control center for workpieces, including a device for transporting workpieces between one or more workpiece assembly or dismantling stations, and one or more machining tools. Also included is a plurality of workpiece carriers having on their underside a transport screw which can be rigidly coupled with the transport screw of one of the machining tools, or with the transport screw of one of the assembly or dismantling stations, or with the transport screw of one or more intermediate carriages disposed between the machining tool or tools and the station or stations. An intermediate shaft is disposed between respective ones of the parts which are to be coupled, with this shaft coupling the screws of these parts. The intermediate shaft has a longitudinal axis about which it is rotatable, and has a further axis which extends at right angles to the longitudinal axis and about which the shaft is pivotable. A common drive mechanism is provided for the rotational and pivotal movements.

7 Claims, 12 Drawing Figures

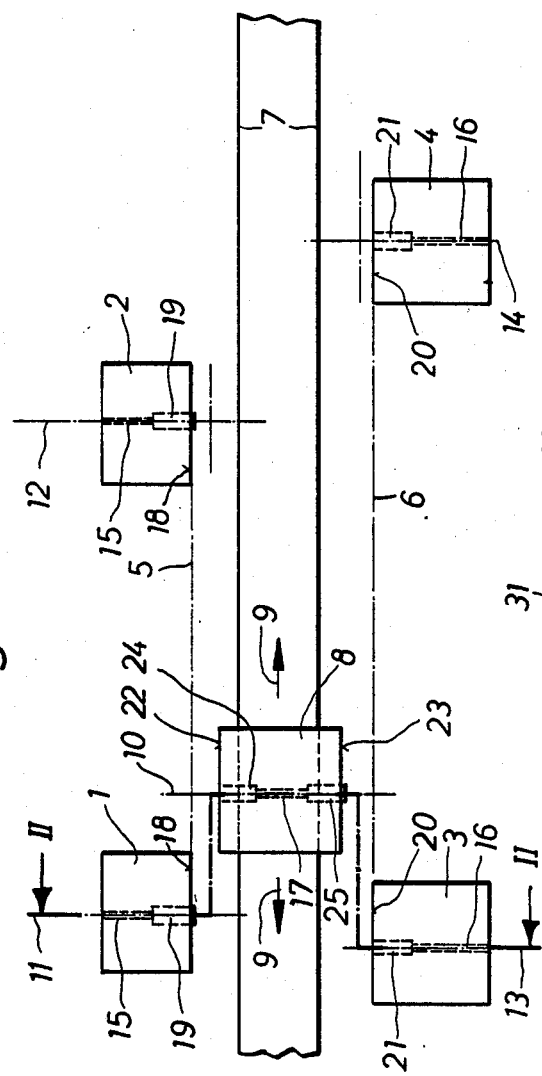
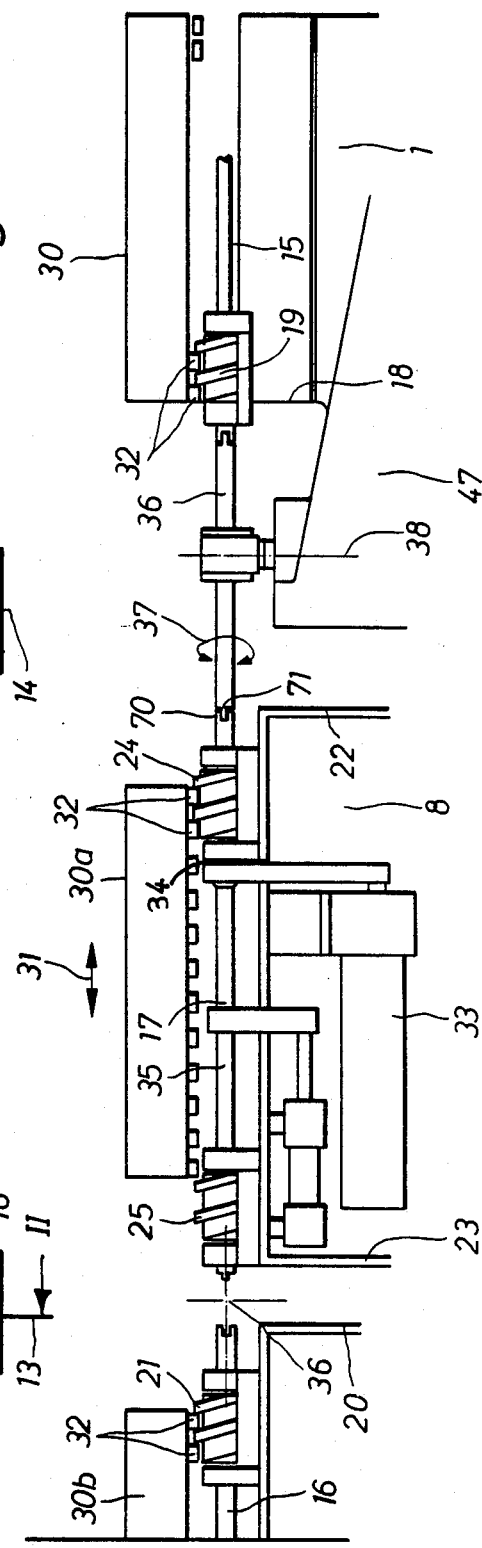

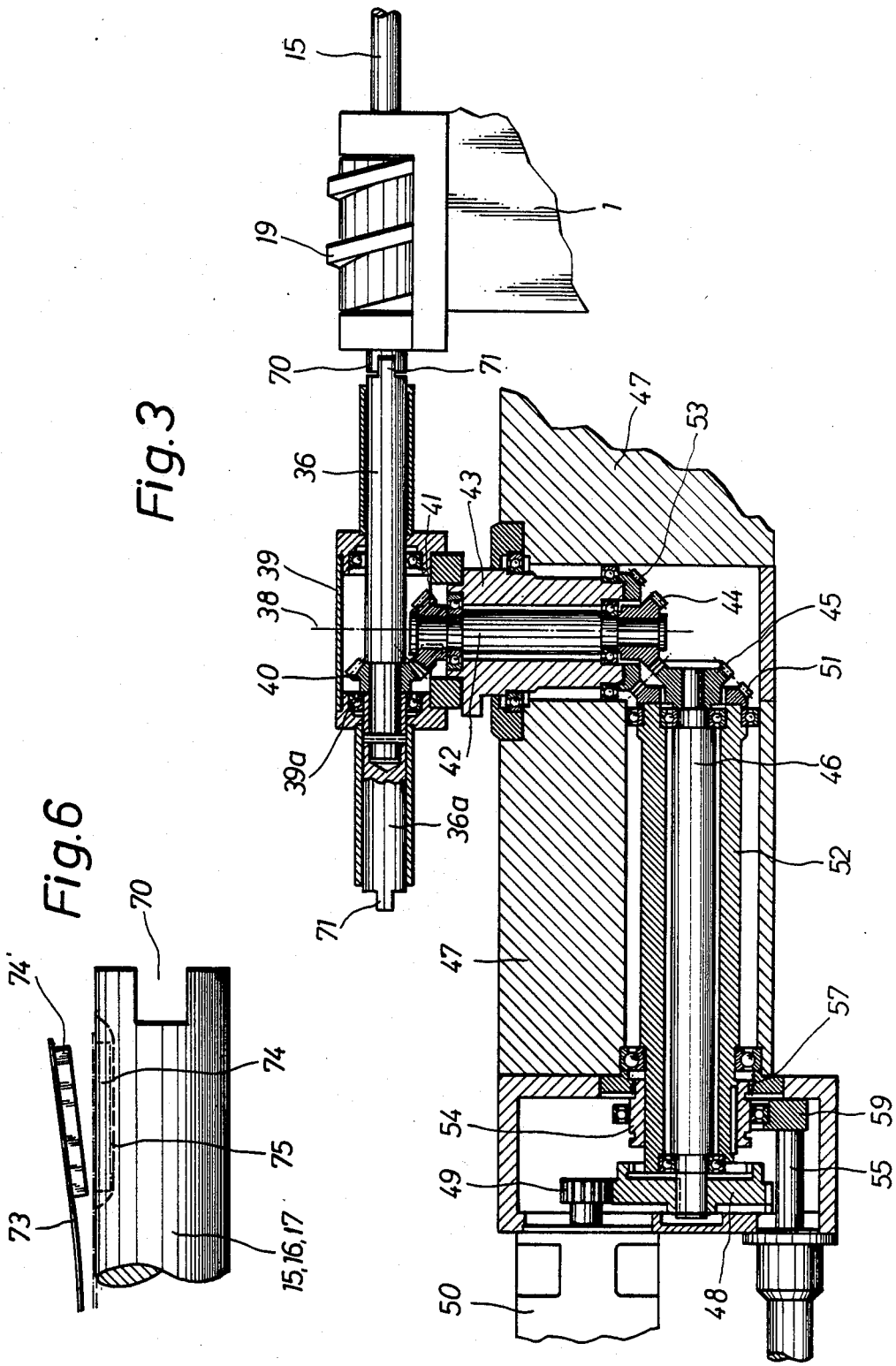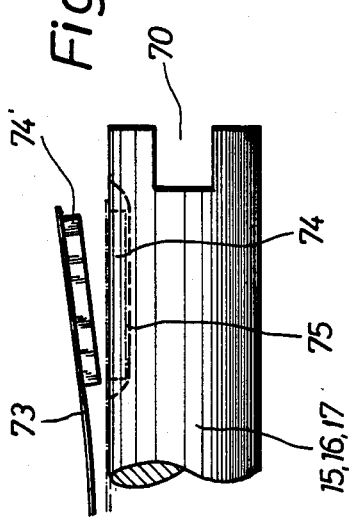

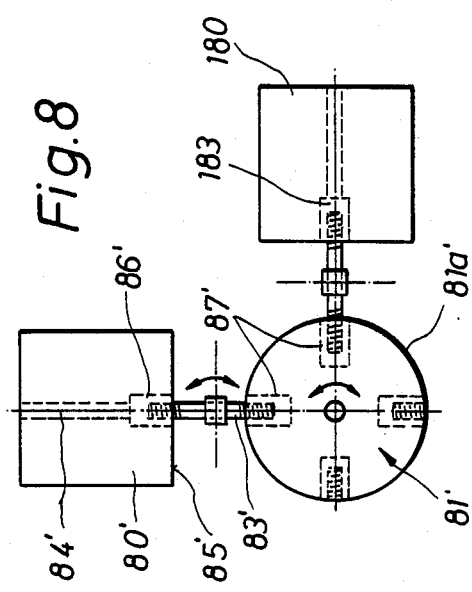
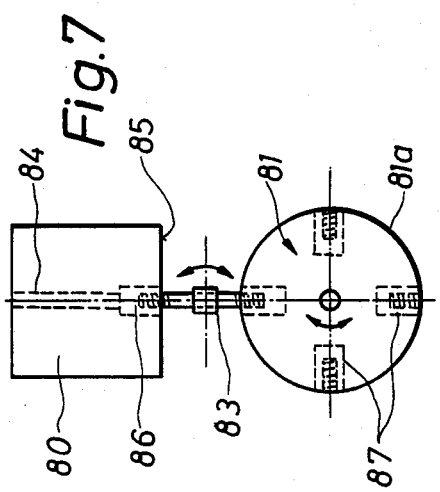
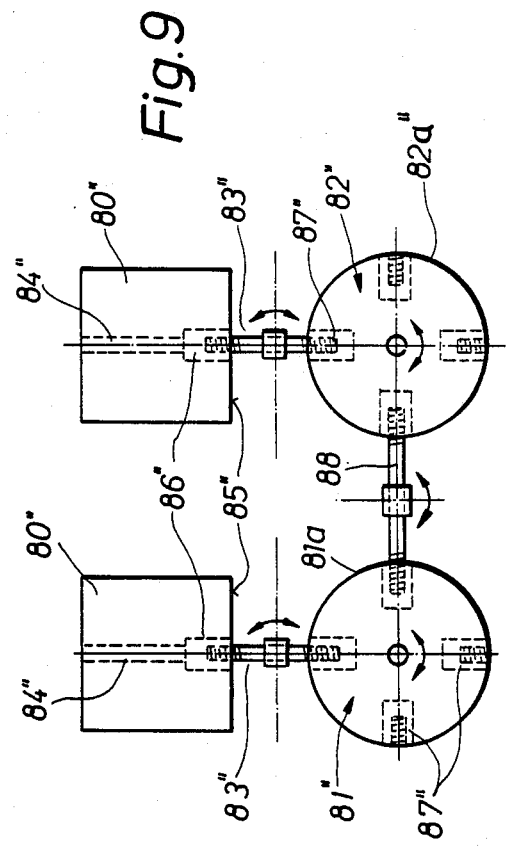

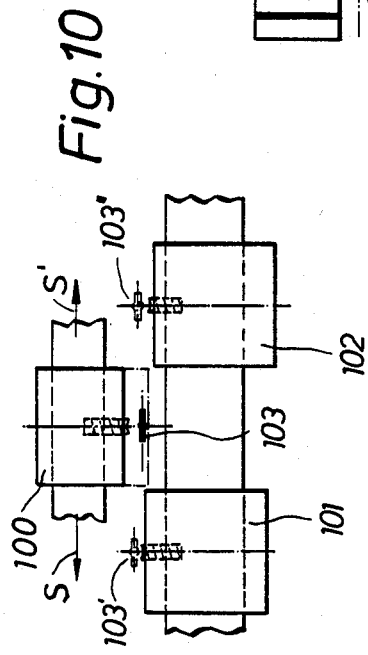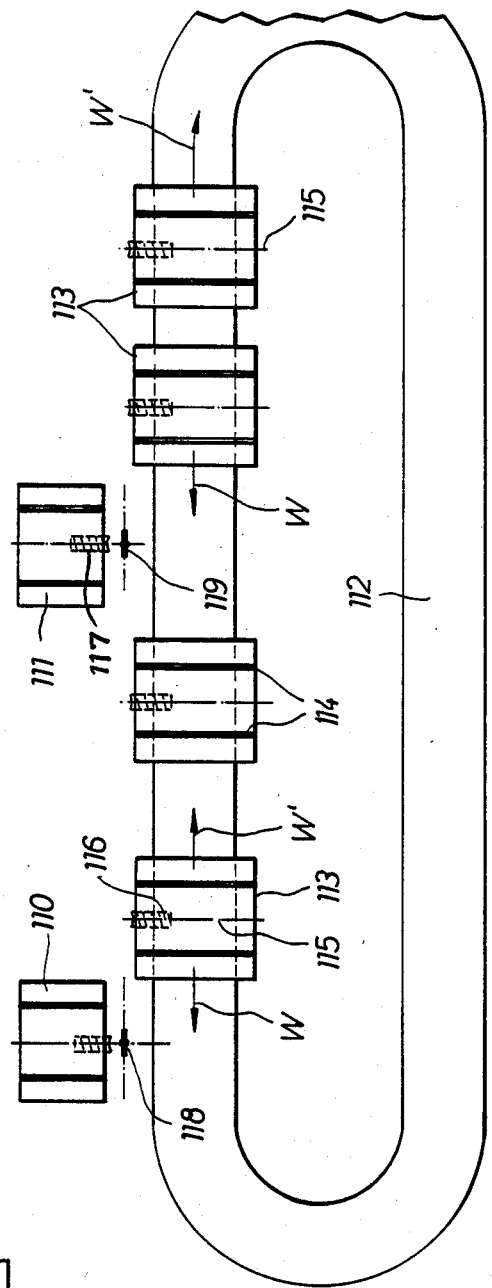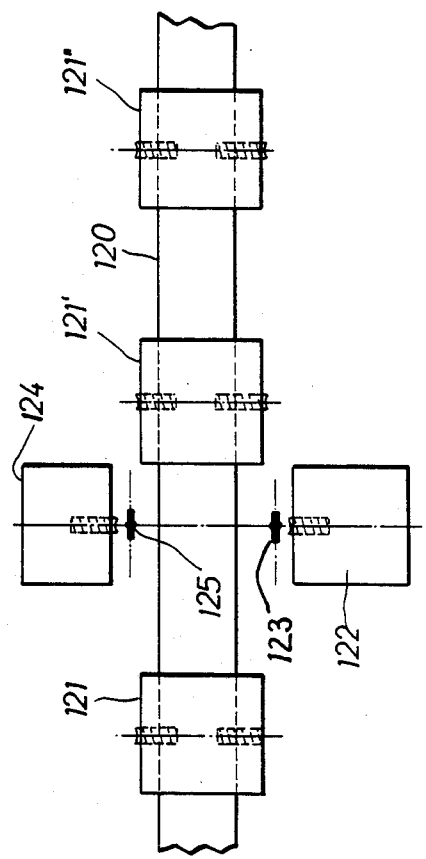

CONTROL CENTER FOR WORKPIECES

BACKGROUND OF THE INVENTION

1. Field of the Invention

The present invention relates to a control center or apparatus for handling workpieces, including a device for transporting workpieces between one or more workpiece assembly or dismantling stations, and one or more machining tools, and including a plurality of workpiece carriers (pallets) having on their underside a transport screw which can be rigidly coupled with the transport screw of one of the machining tools, or with a transport screw of one of the stations, or with a transport screw of one or more intermediate carriages disposed between the machining tool or tools and the station or stations.

2. Description of the Prior Art

German Offenlegungsschrift No. 28 51 699 discloses a device for transporting a workpiece from an assembly or dismantling location to a machining tool, and vice versa. With this device, the workpiece carrier (pallet) is movable on rollers along a guideway by means of a motor drive, and the workpiece carrier is provided in its direction of movement with a number of cylindrical rollers which are disposed in the manner of a rack and are rotatably mounted on vertical shafts. At least one of these rollers is in engagement with a transport screw which is rotatably mounted in the guideway of the assembly or dismantling station or the machining tool. The same or similar devices are disclosed in U.S. Pat. No. 2,139,403 Cole dated Dec. 6, 1938, and German Offenlegungsschrift No. 2 048 246. German Offenlegungsschrift No. 31 01 661, which defines a control center of the aforementioned general type, discloses a device for transporting a workpiece carrier (pallet) from an assembly or dismantling station to a machining station. With this device, using the features of German Offenlegungsschrift No. 2 851 699, the workpiece carrier can be transported from a carriage transverse to the feed direction of the workpiece carrier itself, and the carriage has at least one motor driven transport screw which is disposed parallel to the rollers of the workpiece carrier. The carriage is guided past the assembly or dismantling station and the machining tool at such a distance therefrom that the distance from the transport screws disposed in the stations or machining tools from the transport screw located in the carriage is less than the distance between the front and rear roller of the workpiece carrier.

In contrast to these heretofore known transport devices, an object of the present invention is to provide an integral unit comprising a coupling and drive which can be selectively used in a so-called control center which comprises one or more machining tools and a plurality of stationary or movable assembly or dismantling stations, as well as, if desired, one or more carriages which are disposed between the machining tools and the stations, and are movable on rails or are controlled inductively or in some other fashion. Furthermore, the inventive unit should save space, and should be able to be easily installed or removed. In contrast to the heretofore known devices, the distance of the aforementioned parts of the control center can be greater than possible with a displacement coupling. The control center can also have a different construction; for example, a circular or oval arrangement of the assembly or dismantling stations can be selected which can be moved in common on a circular or oval way ahead of the machining tool or tools. While saving space, the inventive unit should be able to be used at almost any location of the control center, for example preferably stationarily on the machining tool or tools or stations, so that when an intermediate carriage is used, the latter can be released from the coupling with the drive.

BRIEF DESCRIPTION OF THE DRAWINGS

These objects, and other objects and advantages of the present invention, will appear more clearly from the following specification in conjunction with the accompanying drawings, in which:

FIG. 1 is a schematic plan view of one embodiment of the inventive control center;

FIG. 2 is a vertical section taken along the line II—II of FIG. 1, and shows a machining tool, a carriage, and an assembly or dismantling station;

FIG. 3 is a section through the rotatable and pivotable intermediate shaft along with its drive mechanism;

FIG. 6 shows a detail on one of the shafts of the machining tool, the intermediate shaft, or the assembly or dismantling station;

FIGS. 7 and 8 show further control centers having either one or two machining tools, and a turntable-like assembly or dismantling station;

FIG. 9 shows an inventive embodiment of a control center having two machining tools and two turntable-like assembly or dismantling stations;

FIG. 10 shows a control center having a machining tool which can be moved to the level of two assembly or dismantling stations;

FIG. 11 shows a control center having two machining tools and a carriage which is guided on an oval track and serves as the assembly or dismantling stations; and FIG. 12 shows a control center which has an assembly or dismantling station located opposite the machining tool and on the same axis as the latter, and which has a plurality of movable carriages, as storage elements, disposed between the machining tool and the assembly or dismantling station.

SUMMARY OF THE INVENTION

Figure 4:
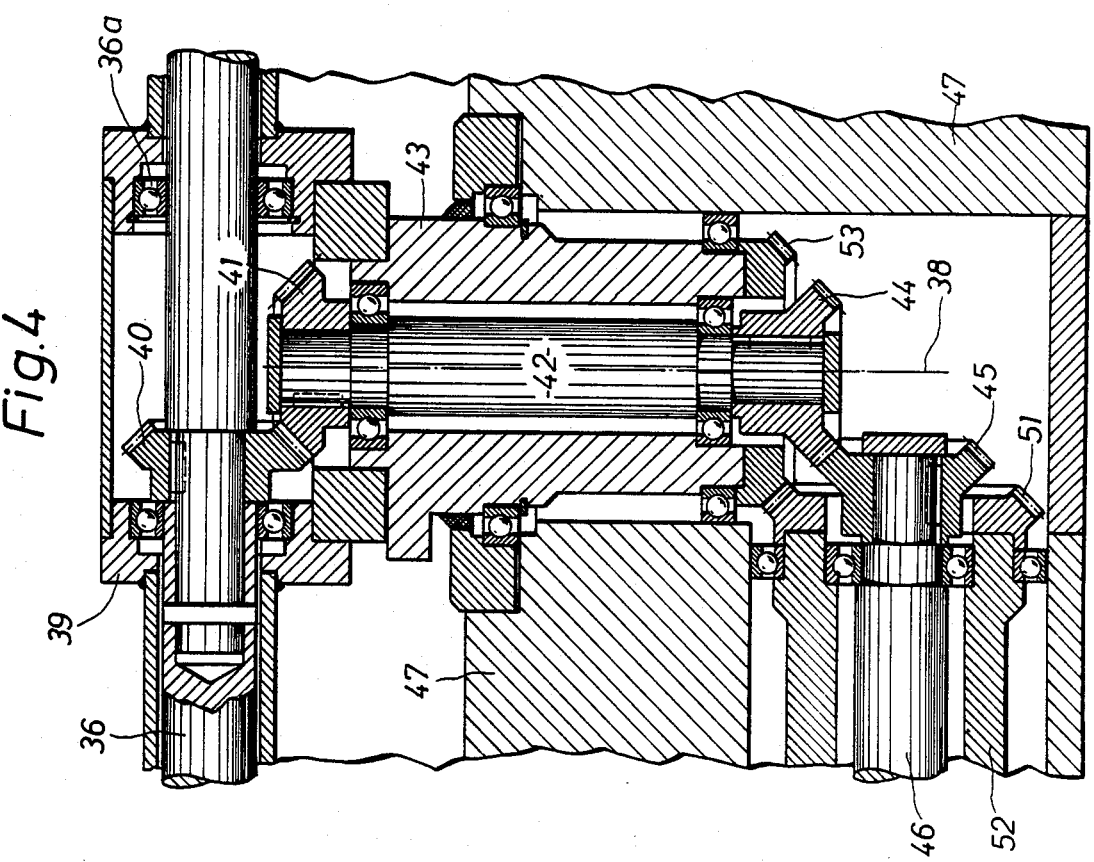
FIGS. 4 and 5 show portions of FIG. 3 to a larger scale.

The control center or apparatus for handling workpieces of the present invention is characterized primarily in that an intermediate shaft is disposed between the machining tool or tools and the intermediate carriage or carriages, or between the tool or tools and the movable stations, or between the intermediate carriage or carriages and the station or stations; the intermediate shaft is pivotable about a vertical axis, and couples the screw shaft of the tool or tools with the screw shaft of the intermediate carriage or carriages or with the screw shaft of the station or stations; the intermediate shaft also has a common drive for the rotational and pivotal movements.

Further features and improvements of the present invention will be described subsequently.

In contrast to the heretofore known devices, the inventive embodiment of a control center has an integral unit for both pivoting and rotating the coupling or intermediate shaft between the machining tool or tools, the station or stations, or the intermediate carriage or carriages, so that this unit can be installed at any location of the control center, even at a later time, for example after the configuration of the center has been altered. The common drive for the rotation and the pivoting results in a savings of space and weight.

DESCRIPTION OF PREFERRED EMBODIMENTS

Referring now to the drawings in detail, in the embodiment of FIG. 1, two machining tools 1, 2 are disposed at the same lateral height, as are two assembly or dismantling stations 3, 4. Between the line 5 which connects the fronts of the machining tools 1, 2, and line 6 which connects the fronts of the assembly or dismantling stations 3, 4, there is disposed a guideway 7 which extends parallel to these lines 5, 6. With the aid of non-illustrated means, a carriage 8 can be moved in the direction of the double arrow 9 so that in each case the carriage can be moved to the level of the machining tools 1, 2 and the assembly or dismantling stations 3, 4 in such a way that the longitudinal axis 10 of the carriage is aligned with the respective longitudinal axes 11, 12, 13, 14 of the machining tools or of the assembly or dismantling stations.

The machining tools 1, 2 are provided with screw shafts 15, the assembly or dismantling stations 3, 4 are provided with screw shafts 16, and the carriage 8 is provided with a screw shaft 17. The screw shafts 15, 16 can be embodied in such a way that they are only provided with screw threads 19 or 21 at the fronts or faces 18 or 20 of the machining tools 1, 2 or the assembly or dismantling stations 3, 4 respectively. The screw shaft 17 is provided with screw threads 24, 25 at the faces 22, 23 of the carriage 8.

The machining tools 1, 2, the assembly or dismantling stations 3, 4, and the carriage 8 are provided with non-illustrated guides which extend in the direction of their longitudinal axes 10-14, and on which can be moved a workpiece carrier (pallet). Therefore, such a workpiece carrier 30 can be moved out of its right hand position on the machining tools 1, 2 as shown in FIG. 2 into the position 30a on the carriage 8, and from there into the position 30b on the assembly or dismantling stations 3, 4, and vice versa. It is also possible to move the workpiece carrier in the direction of the arrow 9 in the position 30a on the carriage 8.

In order to move the workpiece carrier (pallet), on which the workpiece is fixed, in the direction of the double arrow 31 (FIG. 2) in the previously described manner, the bottom of the workpiece carrier 30 is provided with a number of successive, rotatable rollers 32. The diameter and spacing of the rollers 32 is such that when at least one of the rollers of the workpiece carrier 30 engages the screw threads 19, 21, 24, 25, the workpiece carrier can be moved in the desired direction.

In the embodiment illustrated in FIG. 2, the carriage 8 has a drive motor 33 which rotates the section 34 of the screw shaft 17 of the carriage. A similar drive can be provided for the second section 35 of the shaft 17. It is also possible to provide a different driving mechanism for the continuous, one-piece shaft 17 in such a way that the shaft can be reversibly rotated in either direction in order to selectively enable the workpiece carrier (pallet) 30 to be moved to the left or to the right in the direction of the double arrow 31. The carriage 8 is furthermore provided with a non-illustrated transport drive.

A respective intermediate shaft 36 is provided between the machining tools 1, 2 and the guideway 7 of the carriage 8, and between this guideway and the assembly or dismantling stations 3, 4. Each intermediate shaft 36 can be rotated about its longitudinal axis in the direction of the double arrow 37 (FIG. 2), and is pivotable about its vertical central axis 38 in at least one direction. As will be described in greater detail subsequently, the shaft 36 is rotatably mounted and driven in such a way that it is able to selectively couple either the shafts 15, 17 or the shafts 16, 17 with one another, thereby transmitting the rotational movement of the driven shaft to the non-driven shafts. In the embodiment of FIG. 2, therefore, when the intermediate shaft 36 becomes operational, the shafts 15 or 16 are driven by the motor 33 via the shaft 17.

Figure 5:
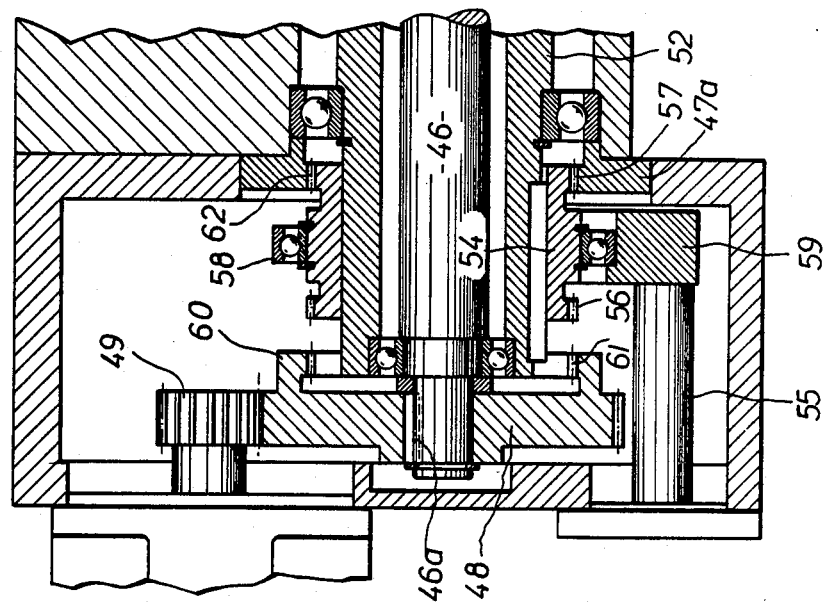

In the illustrated embodiment of the intermediate shaft 36, and of its rotary and pivot drives as shown in FIGS. 3 to 5, a motor, and the corresponding gearing for driving the shaft 17, on the carriage 8, the machining tools 1, 2, and the stations 3, 4 can be dispensed with, since the intermediate shaft 36 itself is rotated and is able to drive the adjacent shafts with the aid of the couplings at its ends.

With the aid of the bearing 39a, the intermediate shaft 36 is mounted in a housing 39. Fixedly supported by the central region of the shaft 36, in the vicinity of the central axis 38, is a bevel gear 40 which engages a bevel gear 41 of a vertical shaft 42 mounted in a sleeve 43, which in turn is rotatably mounted in the stationary machining tool housing 47. The lower end of the shaft 42 is provided with a further bevel gear 44 which meshes with a bevel gear 45 of a horizontal shaft 46. As shown on the left side of FIG. 3, the end of the shaft 46 is provided with a gear arrangement which is comprised of the gears 48, 49, and can be driven by a non-illustrated motor at 50.

The sleeve 43, which rotatably accommodates the shaft 42, supports the housing 39, so that when the sleeve 43 is rotated, the housing 39, and hence the intermediate shaft 36, can be pivoted about the vertical central axis 38. For this purpose, the bottom end of the rotatable sleeve 43 is provided with a bevel gear 53 which meshes with a bevel gear 51 of a horizontal sleeve 52 which surrounds the shaft 46; the bevel gear 53 meshes with the bevel gear 51 in such a way that when the sleeve 52 rotates, pivoting of the shaft 36 is effected. Fixedly disposed on the back or left end of the sleeve 52 is a sliding ring 54 which can be moved in the longitudinal direction on the sleeve 52. For this purpose, the piston rod 55 of a non-illustrated cylinder/piston unit is provided. One end of the sliding ring 54 is provided with a spur gear 56, and the other end is provided with a further spur gear 57. A ring member or bearing 58 is provided between the two spur gears; with the aid of this ring member or bearing 58, the front end 59 of the piston rod 55 engages the sliding ring 54.

The gear 48 has an extension 60 which is provided with an internal gearing 61 with which the spur gear 56 of the sliding ring 54 can mesh. At the same time, the housing 47 has an internal gear 62 with which the spur gear 57 of the sliding ring 54 can mesh. The spacing of the internal gearing 61 and of the internal gear 62 relative to the two spur gears 56, 57 of the sliding ring 54 is such that the spur gear 56 can effectively mesh with the internal gearing 61 of the extension 60 without the spur gear 57 meshing with the internal gear 62 of the housing 47. On the other hand, as shown in FIG. 5, the internal gear 62 and the spur gear 57 mesh with one another when the spur gear 56 and the internal gearing 61 are no longer in engagement with one another.

As a result of the described drive mechanism, the intermediate shaft 36 can be rotated about its longitudinal axis in a manner which will be subsequently described in detail. Accordingly, when the piston rod 55 in FIGS. 3 and 5 is moved toward the left, the spur gear 56 of the sliding ring 54 can mesh with the internal gearing 61; as a result, not only is the shaft 46 driven, which is fixedly connected with the gear 48, but the sleeve 52 is also driven by the motor 50. Thus, both the shaft 42 and the rotatable sleeve 43 are rotated, as a result of which the bevel gear 40 rolls on the bevel gear 41, since the transmission ratio of the bevel gears and the gears is 1:1. This assures that when the intermediate shaft 36 is pivoted about its vertical central axis 38, the shaft 36 does not rotate about its longitudinal axis.

As shown in FIGS. 2 and 3, the ends of the shafts 15, 16, 17 are provided with interconnecting parts of a coupling which is embodied as a slot 70 and key 71.

In order to arrest and hold the shafts 15, 16, 17 in a position which permits the slot 70 and key 71 to intermesh when the intermediate shaft 36 is pivoted back into a position which is coaxial to the shafts 15, 16, 17, the mounting of the latter includes an arresting mechanism which is schematically illustrated in FIG. 6. With the aid, for example, of a leaf spring 73, a wedge member 74 is disposed on the mounting and is able to engage an appropriate recess 75 of the shaft 15, 16, 17 in order to hold the latter in this position. The wedge member 74 can be raised from the recess 75 into the position 74' shown in FIG. 6 with suitable means, so that the shaft 15, 16, 17 can again rotate freely. Any other suitable means can also be provided for arresting the shaft 15, 16, 17.

In order, as it pivots, to be able to also hold the intermediate shaft 36 in a position in which the key 71 and the slot 70 are disposed in a horizontal plane, so that it is even possible to pivot the intermediate shaft 36, the spur gear 57 meshes with the internal gear 62 when the piston rod 55 is moved toward the right in FIGS. 3 and 5 with the aid of its cylinder-piston unit.

From the preceding discussion, it is clear that it is not necessary to have a coupling element disposed at the level of the shafts, nor is it necessary for the carriage itself to be provided with a coupling drive.

In the embodiment of the control center illustrated in FIG. 7, a machining tool 80 is disposed ahead of an assembly or dismantling station 81, which is in the form of a turntable 81a. An intermediate shaft 83 of the type described in FIGS. 3 to 5 is disposed between the machining tool 80 and the assembly or dismantling station 81. The machining tool 80 has a shaft 84, with that end of the latter which faces the front 85 of the machining tool being provided with a screw 86. The turntable, in turn, has four screws 87, which in the illustrated embodiment are spaced from one another by 90°, so that the station 81 has three work locations and one transfer location.

In the embodiment of FIG. 8, those parts which are the same as in the embodiment of FIG. 7 are provided with the same reference numeral, followed by a prime. Disposed at right angles to the machining tool 80' is a second machining tool 180, with a further intermediate shaft 183 being disposed between the latter and the turntable 81a'.

In the embodiment of FIG. 9, two machining tools 80'' are again provided, each of which is associated with an assembly or dismantling station 81'', 82'', between which is disposed an intermediate shaft 83'' of the type described in FIGS. 3 to 5. Each of the machining tools is again provided with a shaft 84'', with that end of the latter which faces the front 85'' of the machining tools being provided with a screw 86''. Disposed between the assembly or dismantling stations 81'', 82'' is a further intermediate shaft 88, so that a workpiece carrier can also be substituted between the two assembly or dismantling stations 81'', 82'', so that a workpiece prepared at the station 81'' can also reach the right machining tool 80'', and a workpiece of the station 82'' can reach the left machining tool 80''. Further stations could also be provided which would be connected with the stations 81'', 82'' by further intermediate shafts 88.

The embodiment of the control center illustrated in FIG. 10 shows a machining tool 100 which can be moved in the direction of the arrows S and S', and which is associated with two stationary assembly or dismantling stations 101, 102, from which the workpiece carriers (pallets), with the non-machined workpieces, are brought to the machining tool or its table, or the carriers, with the machined workpieces, are moved from the machining tool or its table to the stations 101, 102. The intermediate shaft 103 can be moved as a single shaft with the machine at the level of the stations 101, 102, or, as shown in dashed lines in FIG. 10, a stationary intermediate shaft 103' or 103'' can be associated with each of the stations 101, 102.

In the embodiment of FIG. 11, the two stationary machining tools 110, 111 are associated with a track 112 on which can be moved, by known means and in the direction of the arrows W, W', carriages 113 having guides 114 for the pallets which are movable in the direction of the axes 115. The carriages 113 are provided with the screws 116, and the machining tools 110, 111 are provided with the screws 117. Stationarily disposed in front of each machining tool is an intermediate shaft 118, 119. In this embodiment, the carriages 113 perform the function of the assembly or dismantling stations, and are movable to the machining tools 110, 111 independently of one another; their number is greater than the number of servicing machining tools.

In the embodiment of FIG. 12, the carriages 121, 121', 121'', which are movable independently of one another on a track 120, perform a storage function. These carriages take charge of the workpieces from an assembly or dismantling station 122 with the aid of the stationary intermediate shaft 123 which is disposed in front of the station. The carriages do not transfer the workpieces to the machining tool 124 until they are needed; this transfer is effected with the aid of a stationary intermediate shaft 125 of the type disclosed in FIGS. 3 to 5.

The preceeding examples show that the intermediate shaft 36 is disposed directly, or under the interposition of carriages, between one or more stations and one or more machining tools. In place of carriages which can be moved transversely on wheels or runners, a plurality of transverse supports or other conveying means could also be used in an equivalent manner.

The present invention is, of course, in no way restricted to the specific disclosure of the specification and drawings, but also encompasses any modifications within the scope of the appended claims.

What I claim is:

1. A control center for handling workpieces, including a device for transporting workpieces between one or more workpiece assembly or dismantling stations, and one or more machining tools, and including a plurality of workpiece carriers having on their underside a transport screw which can be rigidly coupled with the transport screw of one or said machining tools, or with the transport screw of one of said assembly or dismantling stations, or with the transport screw of one or more intermediate carriages disposed between said machining tool or tools and said station or stations; the improvement therewith which comprises:

an intermediate shaft, which is disposed between respective ones of said parts which are to be coupled, and which couples said transport screws of said parts; said intermediate shaft has a longitudinal axis about which it is rotatable, and a further axis which extends at right angles to said longitudinal axis and about which said intermediate shaft is pivotable;

a common drive mechanism for said rotational and pivotal movements;

said intermediate shaft being rotatable about its longitudinal axis independent of said pivot movement;

a rotary-drive shaft, and a first sleeve which accommodates said rotary-drive shaft and has a central axis which extends parallel to said further axis of said intermediate shaft; the latter is supported by said first sleeve, and said rotary-drive shaft and said first sleeve can be driven in common at the same time;

said first sleeve being adapted to be fixed in one of its rotated positions;

a further shaft, and a second sleeve for accommodating said further shaft; which includes two coaxial bevel gear arrangements whereby said further shaft and said second sleeve drive said rotary-drive shaft and said first sleeve respectively; and which includes a sliding block coupling which is adjustably disposed on said second sleeve;

said intermediate shafts and said transport screws having shaft ends with coupling mechanisms in the form of slots and keys.

2. A control center according to claim 1, which includes one of said assembly or dismantling stations, embodied as a turntable-like member, in front of each machining tool; and which includes one of said coupling intermediate shafts between each machining tool and its assembly or dismantling station.

3. A control center according to claim 2, which includes an intermediate shaft between each two adjacent assembly or dismantling stations.

4. A control center according to claim 1, which includes a stationary housing having a fixed spur gear; in which said common drive mechanism includes a drive gear common to said further shaft and to said second sleeve; in which said drive gear includes an internal gearing; and in which said sliding block coupling is movable between said internal gearing and said fixed spur gear.

5. A control center according to claim 1, in which one of said intermediate shafts and said transport screws is provided with an arresting groove into which an element can extend in order to arrest said intermediate shaft.

6. A control center according to claim 5, in which said arresting groove and its element are disposed in such a way that when these two parts are effective, they are disposed as a coupling at the ends of said shafts.

7. A control center according to claim 1, in which the transmission ratio of said rotary-drive shaft and said first sleeve is 1:1.

* * * * *